US008856419B2

(12) United States Patent
Corrigan et al.

(10) Patent No.: US 8,856,419 B2
(45) Date of Patent: *Oct. 7, 2014

(54) REGISTER ACCESS IN DISTRIBUTED VIRTUAL BRIDGE ENVIRONMENT

(71) Applicant: International Business Machines Corporation, Armonk, NY (US)

(72) Inventors: Michael J. Corrigan, Rochester, MN (US); David R. Engebretsen, Cannon Falls, MN (US); Bruce M. Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/725,559

(22) Filed: Dec. 21, 2012

(65) Prior Publication Data
US 2013/0117469 A1 May 9, 2013

Related U.S. Application Data

(63) Continuation of application No. 12/839,099, filed on Jul. 19, 2010, now Pat. No. 8,447,909.

(51) Int. Cl.
G06F 13/36 (2006.01)
H04L 12/46 (2006.01)
H04L 12/433 (2006.01)
G06F 15/173 (2006.01)
H04L 12/931 (2013.01)
G06F 13/00 (2006.01)
H04L 12/56 (2006.01)

(52) U.S. Cl.
CPC ........ *G06F 15/1735* (2013.01); *H04L 12/4641* (2013.01); *H04L 12/433* (2013.01); *H04L 45/741* (2013.01); *H04L 49/70* (2013.01); *H04L 49/356* (2013.01)
USPC ............ 710/311; 710/306; 710/316; 710/317

(58) Field of Classification Search
USPC .................................. 710/306, 311, 316, 317
See application file for complete search history.

(56) References Cited

U.S. PATENT DOCUMENTS 5,572,522 A 11/1996 Calamvokis et al.
5,592,476 A 1/1997 Calamvokis et al.
(Continued)

FOREIGN PATENT DOCUMENTS

CN 101110730 A 1/2008
CN 101442502 A 5/2009
(Continued)

OTHER PUBLICATIONS

Cisco Systems, "Integrating the Cisco Catalyst Blade Switch 3130 for Dell PowerEdge M1000e Blade Enclosure into the Cisco Data Center Network Architecture—Design Guide", Oct. 2007, retrieved from the Internet: http://cisco.com/en/US/prod/collateral/sw, 29 pages.

(Continued)

*Primary Examiner* — Brian Misiura
(74) *Attorney, Agent, or Firm* — Toler Law Group

(57) ABSTRACT

Systems and methods to perform a register access are described. A particular method includes receiving a data frame at a bridge element of a plurality of bridge elements in communication with a plurality of server computers. The data frame may include a register access request and may be forwarded from a controlling bridge in communication with the plurality of bridge elements. A register may be accessed and execution of the register access request may be initiated in response to receiving the data frame.

20 Claims, 6 Drawing Sheets

(56) References Cited

U.S. PATENT DOCUMENTS

| | | | |
|---|---|---|---|
| 5,901,140 A | 5/1999 | Van As et al. | |
| 5,995,511 A | 11/1999 | Zhou et al. | |
| 6,018,526 A | 1/2000 | Liu et al. | |
| 6,370,142 B1 | 4/2002 | Pitcher et al. | |
| 6,408,163 B1 | 6/2002 | Fik | |
| 6,421,731 B1 | 7/2002 | Ciotti, Jr. et al. | |
| 6,501,754 B1 | 12/2002 | Ohba et al. | |
| 6,725,281 B1 | 4/2004 | Zintel et al. | |
| 6,802,068 B1 | 10/2004 | Guruprasad | |
| 6,804,236 B1 | 10/2004 | Mahajan et al. | |
| 6,807,172 B1 | 10/2004 | Levenson et al. | |
| 6,873,603 B1 | 3/2005 | Ivaturi | |
| 6,950,431 B1 | 9/2005 | Nozaki et al. | |
| 6,980,547 B1 | 12/2005 | Gally et al. | |
| 6,993,033 B1 | 1/2006 | Williams | |
| 7,023,857 B1 | 4/2006 | Chiussi et al. | |
| 7,107,360 B1 | 9/2006 | Phadnis et al. | |
| 7,138,733 B2 | 11/2006 | Sanders et al. | |
| 7,167,922 B2 | 1/2007 | Narayanan | |
| 7,233,991 B2 | 6/2007 | Adhikari | |
| 7,272,652 B1 | 9/2007 | Keller-Tuberg | |
| 7,281,039 B1 | 10/2007 | Salkewicz | |
| 7,333,491 B2 | 2/2008 | Chen et al. | |
| 7,751,416 B2* | 7/2010 | Smith et al. | 370/410 |
| 7,756,027 B1* | 7/2010 | Reddy et al. | 370/230 |
| 7,831,759 B2 | 11/2010 | Boyd et al. | |
| 7,876,746 B1 | 1/2011 | Pannell et al. | |
| 7,889,728 B2 | 2/2011 | Arad et al. | |
| 7,969,980 B1 | 6/2011 | Florit et al. | |
| 7,992,149 B2 | 8/2011 | Carollo et al. | |
| 8,054,832 B1 | 11/2011 | Shukla et al. | |
| 8,085,791 B1 | 12/2011 | Aggarwal et al. | |
| 8,090,805 B1 | 1/2012 | Chawla et al. | |
| 8,102,848 B1 | 1/2012 | Rao | |
| 8,121,126 B1 | 2/2012 | Moisand et al. | |
| 8,190,960 B1 | 5/2012 | Bahadur et al. | |
| 8,194,534 B2* | 6/2012 | Pandey et al. | 370/216 |
| 8,259,720 B2 | 9/2012 | Farinacci et al. | |
| 8,271,680 B2 | 9/2012 | Salkewicz | |
| 8,345,536 B1 | 1/2013 | Rao et al. | |
| 8,358,661 B2 | 1/2013 | Armstrong et al. | |
| 8,369,296 B2 | 2/2013 | Armstrong et al. | |
| 8,379,642 B2 | 2/2013 | Armstrong et al. | |
| 8,385,356 B2 | 2/2013 | Armstrong et al. | |
| 8,447,909 B2 | 5/2013 | Corrigan et al. | |
| 8,489,763 B2 | 7/2013 | Armstrong et al. | |
| 2001/0043614 A1 | 11/2001 | Viswanadham et al. | |
| 2002/0176370 A1 | 11/2002 | Ohba et al. | |
| 2003/0026268 A1 | 2/2003 | Navas | |
| 2003/0037163 A1 | 2/2003 | Kitada et al. | |
| 2003/0236852 A1 | 12/2003 | Fernandes et al. | |
| 2004/0037279 A1* | 2/2004 | Zelig et al. | 370/390 |
| 2004/0174898 A1 | 9/2004 | Kadambi et al. | |
| 2004/0179476 A1 | 9/2004 | Kim et al. | |
| 2004/0199698 A1 | 10/2004 | Bolian et al. | |
| 2005/0201406 A1 | 9/2005 | Sekine et al. | |
| 2006/0023708 A1 | 2/2006 | Snively et al. | |
| 2006/0149886 A1 | 7/2006 | Chen et al. | |
| 2006/0159092 A1 | 7/2006 | Boers et al. | |
| 2006/0248158 A1 | 11/2006 | Ha et al. | |
| 2006/0251067 A1 | 11/2006 | DeSanti et al. | |
| 2007/0030817 A1 | 2/2007 | Arunachalam et al. | |
| 2007/0047536 A1 | 3/2007 | Scherer et al. | |
| 2007/0067432 A1 | 3/2007 | Tarui et al. | |
| 2007/0111414 A1 | 5/2007 | Chaudhry et al. | |
| 2007/0147368 A1 | 6/2007 | Desai et al. | |
| 2007/0184572 A1 | 8/2007 | Kohli et al. | |
| 2007/0260910 A1* | 11/2007 | Jain et al. | 714/4 |
| 2007/0266179 A1* | 11/2007 | Chavan et al. | 709/250 |
| 2007/0268830 A1 | 11/2007 | Li et al. | |
| 2007/0299987 A1* | 12/2007 | Parker et al. | 709/246 |
| 2008/0002579 A1 | 1/2008 | Lindholm et al. | |
| 2008/0056300 A1 | 3/2008 | Williams | |
| 2008/0069100 A1 | 3/2008 | Weyman et al. | |
| 2008/0107109 A1 | 5/2008 | Michaud | |
| 2008/0109565 A1* | 5/2008 | Ajanovic et al. | 710/8 |
| 2008/0159260 A1 | 7/2008 | Vobbilisetty et al. | |
| 2008/0159277 A1 | 7/2008 | Vobbilisetty et al. | |
| 2008/0219237 A1 | 9/2008 | Thubert et al. | |
| 2008/0275975 A1* | 11/2008 | Pandey et al. | 709/223 |
| 2009/0037977 A1 | 2/2009 | Gai et al. | |
| 2009/0161674 A1 | 6/2009 | Bou-Diab et al. | |
| 2009/0161692 A1 | 6/2009 | Hirata et al. | |
| 2009/0201928 A1 | 8/2009 | Chen et al. | |
| 2009/0213869 A1 | 8/2009 | Rajendran et al. | |
| 2009/0245791 A1 | 10/2009 | Thaler et al. | |
| 2009/0252181 A1 | 10/2009 | Desanti | |
| 2009/0254677 A1 | 10/2009 | Desanti | |
| 2009/0265501 A1 | 10/2009 | Uehara et al. | |
| 2009/0276526 A1 | 11/2009 | Carlson et al. | |
| 2009/0323518 A1 | 12/2009 | Rose et al. | |
| 2010/0036995 A1 | 2/2010 | Nakayama et al. | |
| 2010/0054246 A1 | 3/2010 | Shah et al. | |
| 2010/0067374 A1 | 3/2010 | Elangovan et al. | |
| 2010/0067910 A1 | 3/2010 | Mizutani et al. | |
| 2010/0074175 A1 | 3/2010 | Banks et al. | |
| 2010/0085966 A1 | 4/2010 | Samuels et al. | |
| 2010/0107162 A1 | 4/2010 | Edwards et al. | |
| 2010/0128605 A1 | 5/2010 | Chavan et al. | |
| 2010/0150174 A1 | 6/2010 | Bhide et al. | |
| 2010/0257263 A1 | 10/2010 | Casado et al. | |
| 2010/0257269 A1 | 10/2010 | Clark | |
| 2010/0325257 A1 | 12/2010 | Goel et al. | |
| 2011/0038292 A1 | 2/2011 | Salomone et al. | |
| 2011/0055433 A1 | 3/2011 | Kishore et al. | |
| 2011/0061094 A1 | 3/2011 | Salkewicz | |
| 2011/0069710 A1 | 3/2011 | Naven et al. | |
| 2011/0085546 A1 | 4/2011 | Capello et al. | |
| 2011/0085557 A1* | 4/2011 | Gnanasekaran et al. | 370/401 |
| 2011/0103391 A1 | 5/2011 | Davis et al. | |
| 2011/0134915 A1 | 6/2011 | Srinivasan | |
| 2011/0153715 A1 | 6/2011 | Oshins et al. | |
| 2011/0213868 A1 | 9/2011 | Chen et al. | |
| 2011/0219208 A1 | 9/2011 | Asaad et al. | |
| 2011/0243134 A1* | 10/2011 | Armstrong et al. | 370/392 |
| 2011/0243146 A1* | 10/2011 | Armstrong et al. | 370/401 |
| 2011/0258340 A1* | 10/2011 | Armstrong et al. | 709/238 |
| 2011/0258641 A1* | 10/2011 | Armstrong et al. | 719/327 |
| 2011/0261687 A1* | 10/2011 | Armstrong et al. | 370/230 |
| 2011/0261815 A1* | 10/2011 | Armstrong et al. | 370/390 |
| 2011/0261826 A1* | 10/2011 | Armstrong et al. | 370/401 |
| 2011/0261827 A1* | 10/2011 | Armstrong et al. | 370/401 |
| 2011/0262134 A1* | 10/2011 | Armstrong et al. | 398/45 |
| 2011/0264610 A1* | 10/2011 | Armstrong et al. | 706/12 |
| 2011/0320671 A1* | 12/2011 | Armstrong et al. | 710/306 |
| 2012/0027014 A1 | 2/2012 | Mack-Crane et al. | |
| 2012/0036236 A1 | 2/2012 | Richardson et al. | |
| 2012/0039235 A1 | 2/2012 | Chen et al. | |
| 2012/0113987 A1 | 5/2012 | Riddoch et al. | |
| 2012/0147743 A1 | 6/2012 | Singh et al. | |
| 2012/0209940 A1 | 8/2012 | Kidambi et al. | |
| 2012/0236858 A1 | 9/2012 | Armstrong et al. | |
| 2013/0156031 A1 | 6/2013 | Mitsumori | |
| 2013/0182706 A1 | 7/2013 | Angst et al. | |
| 2013/0182707 A1 | 7/2013 | Angst et al. | |

FOREIGN PATENT DOCUMENTS

| | | |
|---|---|---|
| WO | 2006093929 A2 | 9/2006 |
| WO | 2009085536 A2 | 7/2009 |
| WO | 2010024993 A1 | 3/2010 |

OTHER PUBLICATIONS

Cisco Systems, "The Adaptive Architecture for the Data Center Network", Aug. 2007, 3 pages.

Hufferd, J.L., Proxy Based Shortcut; Direct FCoE Data Transfer End to End, Hufferd Enterprises, Oct. 7, 2009, 21 pages.

U.S. Appl. No. 12/765,109; Non-Final Office Action dated Mar. 9, 2012; 12 pages.

U.S. Appl. No. 12/765,109; Non-Final Office Action dated Feb. 8, 2013; 14 pages.

U.S. Appl. No. 12/765,109; Final Office Action dated Jun. 29, 2012; 13 pages.

(56) References Cited

OTHER PUBLICATIONS

U.S. Appl. No. 12/765,109; Notice of Allowance dated Jun. 21, 2013; 10 pages.
U.S. Appl. No. 12/765,128; Non-Final Office Action dated Apr. 3, 2012; 10 pages.
U.S. Appl. No. 12/765,128; Final Office Action dated Aug. 1, 2012; 12 pages.
U.S. Appl. No. 12/765,128; Notice of Allowance dated May 13, 2013; 6 pages.
U.S. Appl. No. 12/765,128; Notice of Allowance dated Jul. 30, 2013; 5 pages.
U.S. Appl. No. 12/763,306; Non-Final Office Action dated Feb. 27, 2012; 20 pages.
U.S. Appl. No. 12/763,306; Notice of Allowance dated Aug. 1, 2012; 6 pages.
U.S. Appl. No. 12/763,306; Notice of Allowance dated Nov. 14, 2012; 5 pages.
U.S. Appl. No. 12/763,306; Notice of Allowance dated Mar. 14, 2013; 5 pages.
U.S. Appl. No. 12/763,323; Non-Final Rejection dated Mar. 28, 2012; 11 pages.
U.S. Appl. No. 12/763,323; Notice of Allowance dated Sep. 14, 2012; 7 pages.
U.S. Appl. No. 12/767,174; Non-Final Office Action dated Feb. 23, 2012; 12 pages.
U.S. Appl. No. 12/767,174; Notice of Allowance dated May 30, 2012; 5 pages.
U.S. Appl. No. 12/767,174; Notice of Allowance dated Oct. 5, 2012; 5 pages.
U.S. Appl. No. 12/767,481; Non-Final Office Action dated Feb. 22, 2012; 10 pages.
U.S. Appl. No. 12/767,481; Notice of Allowance dated Jun. 1, 2012; 5 pages.
U.S. Appl. No. 12/767,481; Notice of Allowance dated Oct. 11, 2012; 5 pages.
U.S. Appl. No. 13/485,766; Non-Final Office Action dated Dec. 13, 2012; 10 pages.
U.S. Appl. No. 13/485,766; Notice of Allowance dated Jul. 18, 2013; 6 pages.
U.S. Appl. No. 12/751,187; Non-Final Office Action dated May 30, 2012; 15 pages.
U.S. Appl. No. 12/751,187; Notice of Allowance dated Oct. 26, 2012; 7 pages.
U.S. Appl. No. 12/839,099; Non-Final Office Action dated Jul. 9, 2012; 7 pages.
U.S. Appl. No. 12/839,099; Final Office Action dated Oct. 25, 2012; 8 pages.
U.S. Appl. No. 12/839,099; Notice of Allowance dated Jan. 11, 2013; 5 pages.
U.S. Appl. No. 12/751,249; Non-Final Office Action dated Oct. 12, 2012; 18 pages.
U.S. Appl. No. 12/751,249; Final Office Action dated Apr. 10, 2013; 16 pages.
U.S. Appl. No. 12/751,249; Notice of Allowance dated Jul. 19, 2013; 8 pages.
U.S. Appl. No. 12/767,506; Non-Final Office Action dated Jan. 18, 2013; 7 pages.
U.S. Appl. No. 12/767,506; Notice of Allowance dated Jun. 17, 2013; 10 pages.
U.S. Appl. No. 12/767,543; Non-Final Office Action dated Oct. 22, 2012; 15 pages.
U.S. Appl. No. 12/767,543; Final Office Action dated May 30, 2013; 17 pages.
International Search Report and Written Opinion of the International Search Authority for dated International Application No. PCT/IB2012/057522 from the International Searching Authority (EPO), mailed on May 30, 2013, 10 pages.
Great Britain Search Report for Application No. GB1300234.0 dated May 8, 2013, 1 page.
International Preliminary Report on Patentability for International Application No. PCT/EP2011/062086 issued Jan. 22, 2013, 6 pages.
International Search Report for International Application No. PCT/EP2011/062086 mailed Oct. 11, 2011, 4 pages.
U.S. Appl. No. 13/352,952 Non-Final Office Action dated Jan. 30, 2014; pp. 1-17.
U.S. Appl. No. 13/352,973; Non-Final Office Action dated Mar. 20, 2014; 40 pages.
U.S. Appl. No. 13/352,973; Restriction Requirement dated Jan. 29, 2014; 6 pages.

* cited by examiner

REGISTER ACCESS IN DISTRIBUTED VIRTUAL BRIDGE ENVIRONMENT

I. CLAIM OF PRIORITY

This application is a continuation patent application of, and claims priority from, U.S. patent application Ser. No. 12/839,099 filed on Jul. 19, 2010 and entitled "Register Access in Distributed Virtual Bridge Environment," which is incorporated by reference herein in its entirety for all purposes.

II. FIELD OF THE DISCLOSURE

The present disclosure relates generally to data communications, and more specifically, to accessing registers in a highly integrated computer network.

III. BACKGROUND

Server computers are continuously managed to enable access to shared switches and other traffic routing resources. For example, contention for routing resources may exist when server computers are housed within racks for space and connectivity considerations, such as in a blade server computer arrangement. The server computers may experience transmission bottlenecks and delays when forwarding data frames through centralized switches, such as shared top of rack switches.

To illustrate, FIG. 1 shows a conventional blade server computer system 100. The system 100 includes a plurality of server computers 106-125 housed within racks 102, 104 and arranged into chassis 138, 140, 142, and 144. An illustrative server computer 106 may include a half-width information technology element (ITE) blade server computer.

Data frame communications between the server computers 106-125 housed within different chassis 138, 140, 142, 144 or racks 102, 104 may be referred to as east-west connectivity. For example, the server computer 111 of a first chassis 140 may forward a data frame to the server computer 106 of another chassis 138 via a path 164. The path 164 includes a chassis switch 154 and a top of rack switch (TOR) 158. The chassis switch 154 and the top of rack switch 158 route the data frame based upon a media access control (MAC) address.

When the server computer 111 of the rack 102 forwards a data frame to the server computer 123 of the rack 104, the data frame travels through paths 166 and 168. The paths 166 and 168 include the top of rack switch 158, an end of rack switch (EOR) 162, and a top of rack switch 160. The top of rack switch 158 is again used when the server computer 111 attempts north-south connectivity (i.e., internal to external data frame communication) through paths 166 and 170. Because the data frames in the above examples are all routed through the top of rack switches 158, 160, a potential bottleneck scenario can result.

Increasing the number of switches and associated connections to accommodate additional traffic may present configuration and management challenges, as well as increase hardware costs and latency. It is therefore desirable to increase the efficiency with which switches may forward data frames between server computers.

IV. BRIEF SUMMARY

In a particular embodiment, an apparatus is disclosed that includes a plurality of distributed bridge elements in communication with a plurality of server computers. Each distributed bridge element may be configured to access a register in response to receiving a data frame that includes a register access request. A controlling bridge may be configured to control the plurality of distributed bridge elements and to generate and communicate the data frame to at least one of the plurality of bridge elements.

In another embodiment, a method of performing a register access includes receiving a data frame at a bridge element of a plurality of bridge elements in communication with a plurality of server computers. The data frame may include a register access request and may be forwarded from a controlling bridge in communication with the plurality of bridge elements. A register may be accessed and execution of the register access request may be initiated in response to receiving the data frame.

In another embodiment, a program product for accessing a register may include a computer readable storage medium having computer readable program code embodied therewith. The computer readable program code may include program instructions resident at a bridge element of a plurality of bridge elements in communication with a plurality of server computers. The program instructions may be configured to receive from a controlling bridge a data frame that includes a register access request, to access a register, and to initiate execution of the register access request in response to receiving the data frame.

At least one of the embodiments may facilitate efficient programming of registers in a highly integrated environment. The controlling bridge may provide trusted (e.g., known and secure) firmware used to control access considerations, such as security, routing, and availability in a consistent manner. The controlling bridge may be configured to access registers of local and remote bridge elements, as well as other hardware nodes, such as adapters and partitions. The automated register accesses may reduce potential bottlenecks and facilitate efficient processing. Fiber Channel over Ethernet may be supported, and an embodiment of a system may be scalable to include hundreds or more server computers with direct connectivity.

Features that characterize embodiments are set forth in the claims annexed hereto and forming a further part hereof. However, for a better understanding of the embodiments, and of the advantages and objectives attained through its use, reference should be made to the Drawings and to the accompanying descriptive matter in which there are described exemplary embodiments.

V. BRIEF DESCRIPTION OF THE DRAWINGS

VI. DETAILED DESCRIPTION

Figure 1:
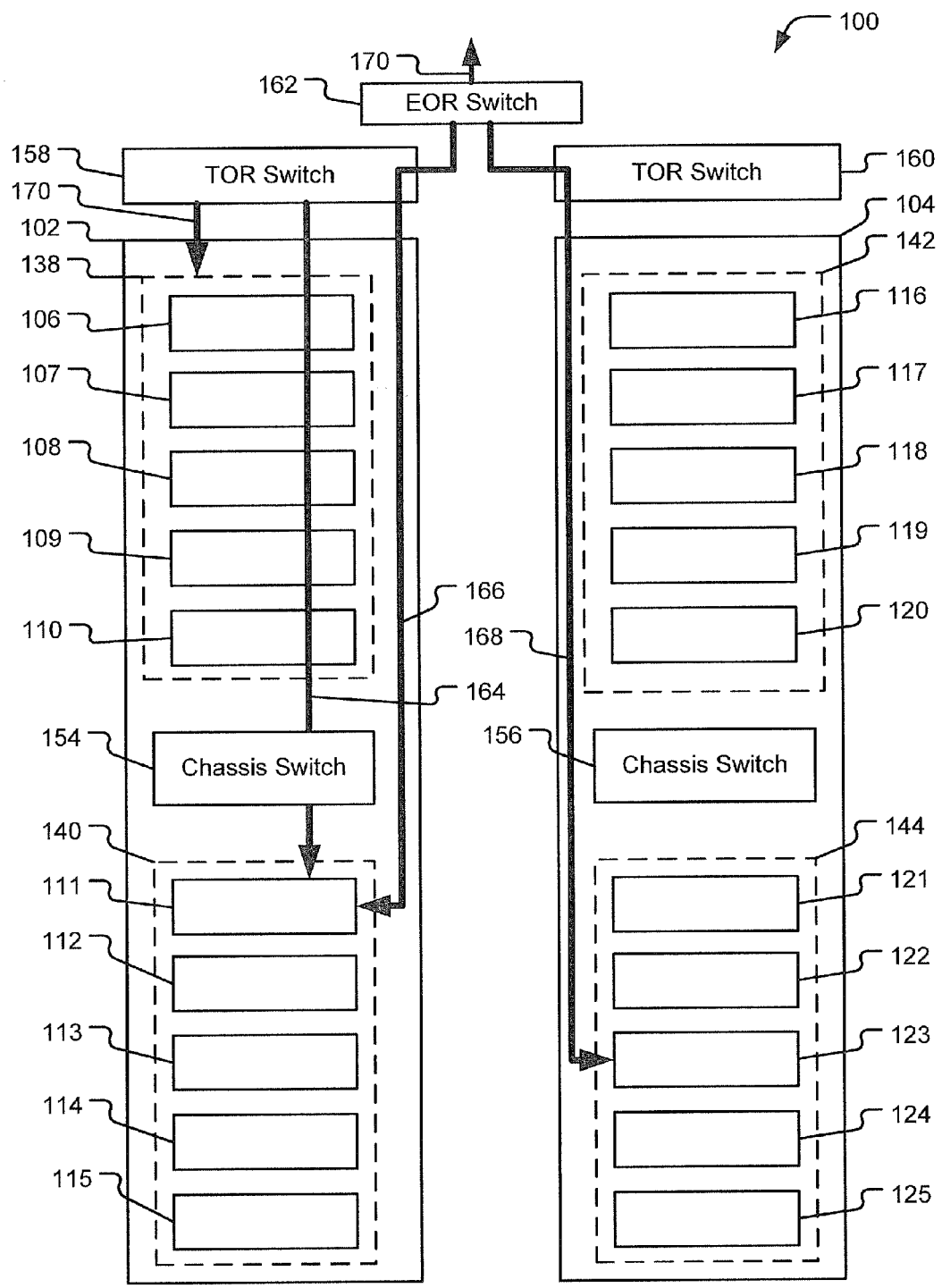
FIG. 1 is a block diagram of a prior art computing system that includes racks of blade server computers.

Firmware of a controlling bridge may control register load and store operations involving multiple, interconnected bridge elements. The controlling bridge may be directly coupled to a local bridge element via a Peripheral Component Interconnect Express (PCIe) and may communicate with the bridge elements using data frames that include register access requests. In a particular embodiment, the system may include a main register ring that uses a token protocol to access registers. An initiating bridge element making a register access request may wait for a token on the main register ring. The token may be used so that only the one bridge element having control of the token may access a target node at a time. When the token becomes available, the register access request may be placed on the main register ring for delivery to the target node. The register access address may be addressed to the bridge element or other target node. The target node may execute the register access request and communicate a response to the initiating bridge element. The initiating bridge element may then return the token to the main register ring.

To prevent conflicting register access operations from multiple controlling bridges, the controlling bridges may select a bridge element to be a bridge element control port. The bridge element control port may be used when accessing registers other than bridge element registers. Bridge element registers may be accessed directly via their respective bridge element to allow parallel access to separate sets of bridge element registers. A bridge element may access its register without a token received from the main register ring. The bridge element may hold off external accesses from the main register ring until all register access requests of the data frame have been completed.

When accessing a register, the controlling bridge may use a firmware based semaphore mechanism. The semaphore mechanism may prevent other controlling bridges from accessing the register at the same time. Each bridge element may include multiple registers for controlling bridges to use as semaphore registers.

Multiple register access requests, or operations, may be included within a single data frame. Illustrative register access operations may include a register load and a register store, as well as a sequential register load and a sequential register store. Other register access operations may include get, check and release functions of a semaphore control operation. Additional examples of register access operations may include AND/OR operations, as well as a compare and swap operation.

A data frame conveying a register access request may additionally include a sequence number field. According to a particular embodiment, a controlling bridge may insert a four byte sequence number in the sequence number field when sending a data frame and associated register access request. The sequence number field may be unchanged by a receiving bridge element that uses the sequence number to update a history queue. The bridge element may return the data frame and sequence number to the controlling bridge. The controlling bridge may use the sequence number of the returned frame to confirm the delivery or to detect a loss of a data frame.

The bridge element that executes the register access request may maintain one or more history queues. An illustrative history queue may include a first-in, first-out (FIFO) memory. The history queue may include entries storing sequence numbers and counts of successfully completed operations (e.g., load and store operations) associated with given data frames. The controlling bridge may read the entries of the history queue to determine if a data frame has been lost. For example, a controlling bridge may access a history queue of a bridge element when a data frame having an expected sequence number is not received at the controlling bridge. The controlling bridge may determine by reading the history queue if the data frame having the sequence number was received by the bridge element. If the data frame was never received, the controlling bridge may resend the data frame. If an entry in the history queue indicates that the data frame was received at the bridge element, then the controlling bridge may read the count of successfully completed operations. The count of successfully completed operations may be used to determine whether an error was encountered while processing a register access request. According to a particular embodiment, the bridge element may maintain multiple history queues (e.g., one history queue for each controlling bridge that may control the bridge element).

The controlling bridge may also maintain a history queue, which may also be a FIFO. The entries of the history queue may include status information. For example, the controlling bridge may set status information of an entry associated with a first register access request to "pending" prior to sending a data frame with the register access request. The status information may be updated to reflect details regarding an error. Entries associated with other register access requests may read "pending" until the first register access is successful. Illustrative status information may include: pending, completed, not completed with a lock conflict, and error (e.g., access timeout, frame too short or too long).

Figure 2:
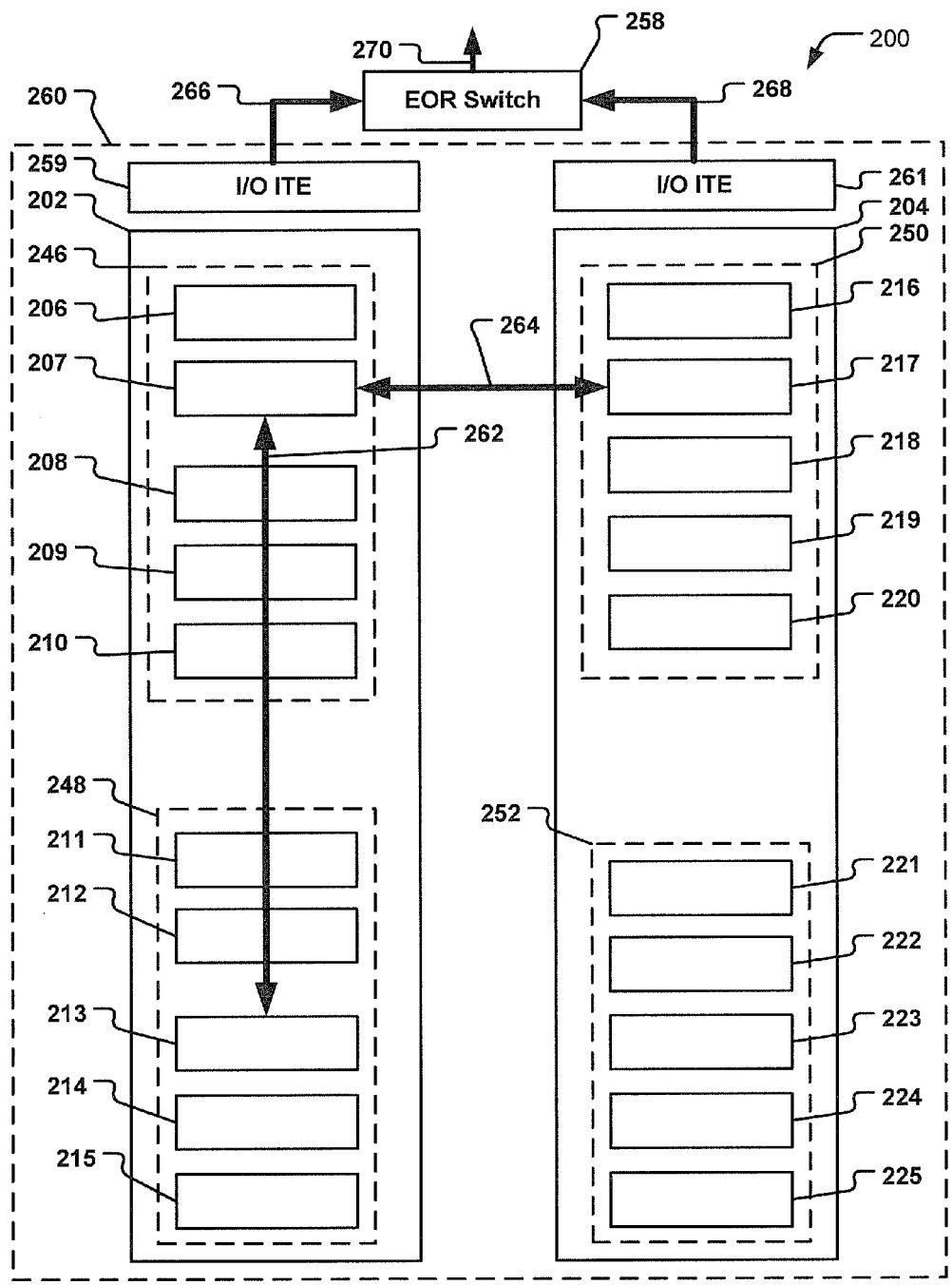
FIG. 2 is a block diagram of an embodiment of a networked computing system configured to allow direct communication between server computers housed within different racks and chassis of blade server computers.

Turning particularly to the drawings, FIG. 2 shows an illustrative embodiment of a highly integrated system 200 configured to forward data frames that include register accesses using a distributed virtual bridge 260. The distributed virtual bridge 260 may extend across server computers 206-225, chassis 246, 248, 250, 252, and racks 202, 204 to provide data link layer (i.e., Layer 3) switching between bridge elements. The bridge elements may provide a frame-based, Ethernet-like interface. The interface may facilitate lossless, point-to-point, in-order frame delivery between server computers 206-225 of different racks 202, 204 or chassis 246, 248, 250, 252 (i.e., east-west connectivity) with reduced redundancy and latency.

The system 200 further includes an end-of-rack switch 258 and input/output (I/O) server ITEs 259, 261 that enable north-south connectivity. The I/O server ITEs 259, 261 may enable uplink connectivity to the external Ethernet network (or other network) for the server computers 206-225 housed within the racks 202, 204.

An arrow 264 of FIG. 2 represents direct east-west connectivity and the flow of data frames between server computers located in different racks 202, 204 of the system 200 (e.g., without using a top of rack or chassis switch). An arrow 262 represents direct east-west connectivity across different chassis 246, 248 of the rack 202.

The system 200 of FIG. 2 may enable direct connectivity between server computers of different racks or chassis. To accommodate the relatively high level of system integration, data frames generated by firmware in communication with server computers may include register access request. The uniform, automated register access processes may streamline register operations and associated processing time.

Figure 3:
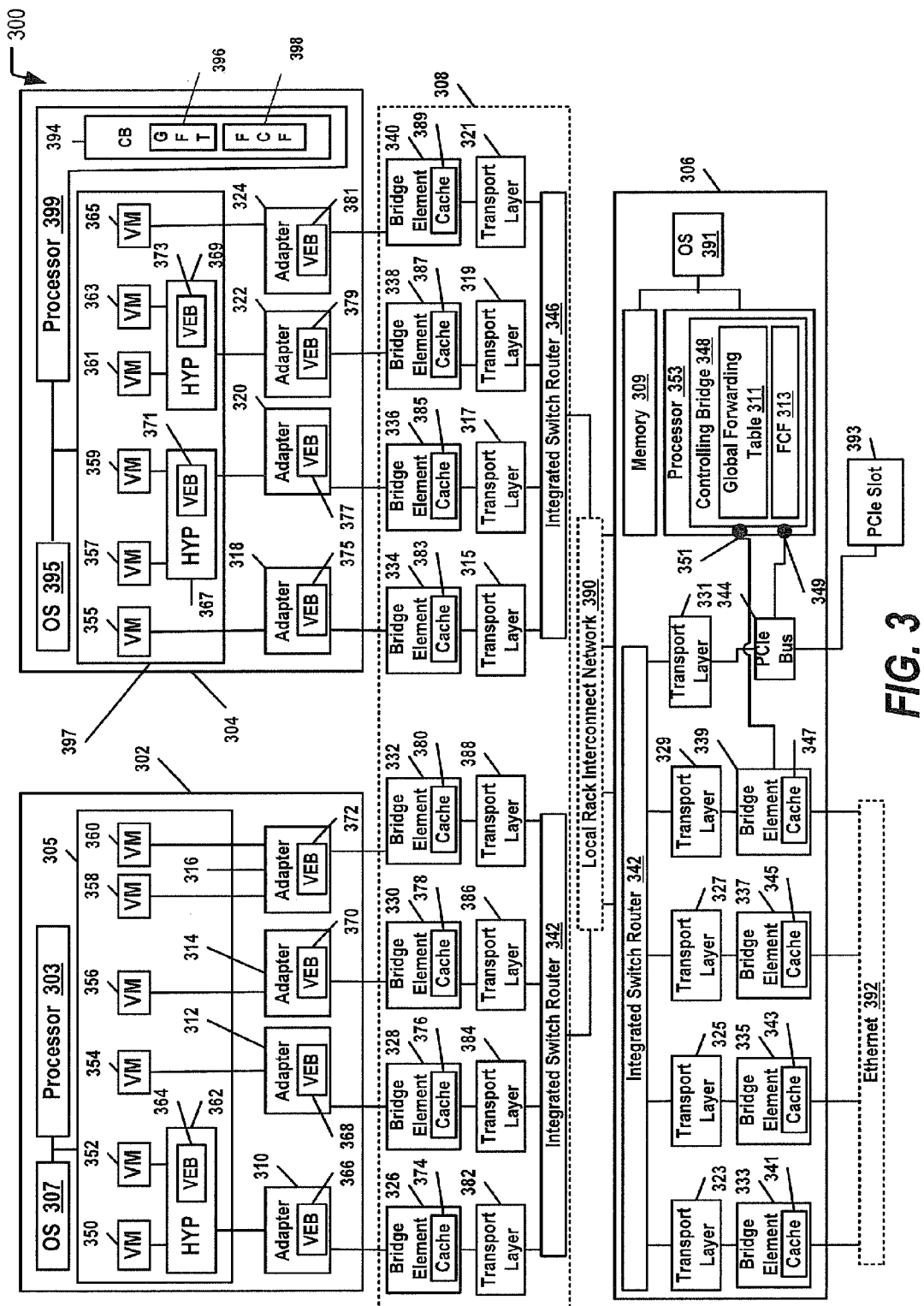
FIG. 3 is a diagram of a particular embodiment of a system configured to remotely access registers using distributed bridge elements and one or more controlling bridges.

FIG. 3 illustrates a particular embodiment of a highly integrated system 300 configured to conduct register access operations using a plurality of distributed bridge elements and one or more controlling bridges. FIG. 3 generally shows a computer system 300 configured to forward data frames using a distributed virtual bridge 308. The distributed virtual bridge 308 may selectively forward data frames having access register requests to distributed bridge elements and other target nodes.

The distributed virtual bridge 308 may be similar to the distributed virtual bridge 260 of FIG. 2. The system 300 includes a first server computer 302 and a second server computer 304 that are both coupled to an I/O blade device 306 via the distributed virtual bridge 308. The server computers 302, 304 and the I/O blade device 306 may be housed within separate chassis and racks.

The distributed virtual bridge 308 may be coupled to multiple adapters 310, 312, 314, 316, 318, 320, 322, and 324. The adapters 310, 312, 314, 316, 318, 320, 322, and 324 may be located within or may be coupled to the server computers 302, 304. The distributed virtual bridge 308 may use multiple access points, or bridge elements 326, 328, 330, and 332-340 to couple to the server computers 302, 304. For example, a microchip that includes the bridge elements 326, 328, 330, and 332 may be cabled or otherwise coupled to a port of the server computer 302 that includes the adapter 310. As explained herein, the distributed virtual bridge 308 may functionally supplant chassis switches and top of rack switches with a frame-based network fabric that functions in a similar fashion to an Ethernet network.

One or more transport layer modules 382, 384, 386, and 388 coupled to the bridge elements 326, 328, 330, and 332 may provide a frame-based, Ethernet-like interface to one or more integrated switch routers 342. The transport layer module 382 may be configured to deconstruct a transmission of data frames so that packet information may be evenly distributed across links to a local rack interconnect 390. The data frames may not be serialized upon leaving the transport layer module 382. A receiving transport layer module 323 may serialize the data frames to achieve reliable, in-order delivery. If the receiving transport layer module 323 determines that data frame information is missing, the transport layer module 323 may initiate a process to recover the missing data. The translation process may be accomplished in hardware, which may provide a larger bandwidth and faster processing than software applications. The transport layer modules 382, 384, 386, and 388, the integrated switch router 342, and the local rack interconnect network 390 may combine to include an underlying lossless, point-to-point communication network (i.e., an integrated switch router network) between the server computers 302, 304 and the I/O blade device 306.

The bridge elements 326, 328, 330, and 332 may function as data link layer (i.e., Layer 2) bridge forwarders within the distributed virtual bridge 308. In particular embodiments, the bridge elements 326, 328, 330, and 332 may comprise a switch, or router device. The bridge elements 326, 328, 330, and 332 may include learned (e.g., received and stored) cached address data used to forward data frames throughout the distributed virtual bridge 308. The learned address data may correspond to one or both of a destination address and a source address associated with a data frame.

When the bridge element 326 does not include address data pertinent to a source or destination address of a received data frame, the bridge element 326 may query a controlling bridge 348 for the address data. The controlling bridge 348 may include a global forwarding table 311 that includes stored address data. The stored address data may be continuously updated by the bridge elements 326, 328, 330, and 332. For example, a bridge element 326 may send an update message to the controlling bridge 348 in response to learning an updated or new MAC address. A corresponding MAC address in the global forwarding table 311 may be subsequently updated.

Conversely, the address data of the global forwarding table 311 may be used to update the bridge elements 326, 328, 330, and 332. For example, the controlling bridge 348 may respond to a query from the bridge element 326 with requested address data. The bridge element 326 may cache the received address data for future use.

The first server computer 302 may comprise a blade server computer, such as the server computer 202 shown in FIG. 2. The first server computer 302 may include one or more virtual machines (VMs) 350, 352, 354, 356, 358, and 360. A virtual machine may include a software implementation of a computer and may execute programs in a manner similar to a physical machine.

FIG. 3 shows an illustrative hypervisor 362 that is coupled to both the virtual machine 350 and the virtual machine 352. The hypervisor 362 may include platform virtualization software that allows multiple operating systems to run concurrently on the first server computer 302. The hypervisor 362 may include a hypervisor virtual bridge 364 that allows direct communication between the virtual machines 350, 352 without traversal of an external network. In one embodiment, the hypervisor virtual bridge 364 may register address information with the controlling bridge 348.

The server computer 302 may include at least one processor 303 coupled to a memory 305. The processor 303 may represent one or more processors (e.g., microprocessors), and the memory 305 may represent random access memory (RAM) devices comprising the main storage of the server computer 302, as well as supplemental levels of memory, e.g., cache memories, non-volatile or backup memories (e.g., programmable or flash memories), read-only memories, etc. In addition, the memory 305 may be considered to include memory storage physically located in the server computer 302 or on another server computer 304 coupled to the server computer 302 via the distributed virtual bridge 308.

The first server computer 302 may operate under the control of an operating system (OS) 307 and may execute or otherwise rely upon various computer software applications, components, programs, objects, modules, and data structures, such as the virtual machines 350, 352, 354, 356, 358, and 360. Moreover, various applications, components, programs, objects, modules, etc. may also execute on one or more processors in another device coupled to the server computer 302 (e.g., in a distributed computing environment, where computing processes may be allocated to multiple server computers).

The first server computer 302 may include the adapters 310, 312, 314, and 316, such as converged network adapters. A converged network adapter may include a single root I/O virtualization (SR-IOV) adapter, such as a Peripheral Component Interconnect Express (PCIe) adapter that supports Converged Enhanced Ethernet (CEE). The adapters 310, 312, 314, and 316 may be used to implement a Fiber Channel over Ethernet (FCoE) protocol. Each adapter 310, 312, 314, and 316 may be coupled to one or more of the virtual machines 350, 352, 354, 356, 358, and 360. The adapters 310, 312, 314, and 316 may facilitate shared access of the virtual machines 350, 352, 354, 356, 358, and 360. While the adapters 310, 312, 314, and 316 are shown in FIG. 3 as being included within the server computer 302, adapters of another embodiment may include physically distinct devices that are separate from the server computers 302, 304.

Each adapter 310, 312, 314, and 316 may include a converged adapter virtual bridge 366, 368, 370, and 372. The converged adapter virtual bridges 366, 368, 370, and 372 may facilitate sharing of the adapters 310, 312, 314, and 316 by coordinating access by the virtual machines 350, 352, 354, 356, 358, and 360. Each converged adapter virtual bridge 366, 368, 370, and 372 may recognize data flows included within its domain. A recognized domain address may be routed directly, without processing or storage outside of the domain of the particular converged adapter virtual bridge 366, 368, 370, and 372. Each adapter 310, 312, 314, and 316 may include one or more CEE transmit ports that couple to one of the bridge elements 326, 328, 330, and 332. In another embodiment, bridge elements may be co-located with the adapters, and coupling between adapters and the bridge elements may not be Ethernet connections.

The bridge elements 326, 328, 330, and 332 may be configured to forward data frames throughout the distributed virtual bridge 308. The bridge elements 326, 328, 330, and 332 may thus function as access points for the distributed virtual bridge 308 by translating between Ethernet and the integrated switch router 342. The bridge elements 326, 328, 330, and 332 may not include buffers and may support CEE at boundaries of the distributed virtual bridge 308. In another embodiment, the bridge elements 326, 328, 330, and 332 may include buffers.

Each bridge element 326, 328, 330, and 332 of the distributed virtual bridge 308 may include a forwarding cache 374, 376, 378, and 380. A forwarding cache 374, 376, 378, and 380 may include a lookup table that stores address data used to forward data frames that are received by the bridge elements 326, 328, 330, and 332. For example, the bridge element 326 may compare address data associated with a received data frame to the address data stored within the forwarding cache 374.

Illustrative address data may include routing information, such as a routing key included within header data of the data frame. The routing key may include at least one of a virtual local area network (VLAN) tag and a logical network identifier, as well as a MAC address. The MAC address may be generated and assigned by a Fiber Channel Forwarder (FCF) 313, as set by an administrator or computing system. The Fiber Channel Forwarder 313, or FCoE switch, may facilitate connectivity between FCoE initiators and Fiber Channel fabrics. To illustrate, an FCoE data frame sent from the first virtual machine 358 and intended for a second virtual machine 363 may be addressed to the Fiber Channel Forwarder 313 in accordance with the FCoE standard. According to standard routing procedures, the Fiber Channel Forwarder 313 may receive and readdress the FCoE data frame for forwarding to the virtual machine 363.

The Media Access Control (MAC) address of the Fiber Channel Forwarder 313 may have been learned by the first server computer 302 during a discovery phase, when the Fiber Channel Forwarder 313 establishes communications with networked devices. During the discovery phase, the second server computer 304 may respond to broadcast queries from the first server computer 302. The Fiber Channel Forwarder 313 may discover the second server computer 304 from the query responses. After the discovery phase, a login phase may be initiated. A MAC address of the server computer 304 may be reassigned by the Fiber Channel Forwarder 313. The reassigned MAC address may be used for subsequent routing and communications between the server computers 302, 304. The Fiber Channel Forwarder 313 may facilitate storage of MAC addresses assigned to the server computers 302, 304.

A VLAN tag may indicate an assigned VLAN, which may be used to segregate traffic and to allow more than one uplink. There may be multiple VLANs on an uplink. Conventionally, each VLAN may use only one uplink port. That is, only one physical uplink port at a given time may be used to forward a data frame associated with a particular VLAN. Through the use of logical networks, a VLAN may use multiple physical ports to forward traffic while maintaining traffic segregation. Link aggregation may be used to bundle several physical links to act as one uplink with higher bandwidth.

A logical network may include a logically specified network portion of the distributed virtual bridge 308. Multiple logical networks may be included within a single bridge element. As such, a logical network may provide an additional layer of traffic separation. When so configured, logical networks may allow different customers to use the same VLAN tag. The VLANs of each customer may remain segregated by virtue of the different logical networks.

The forwarding caches 374, 376, 378, and 380 of the distributed virtual bridge 308 may have a format similar to the global forwarding table 311 of the controlling bridge 348. The forwarding caches 374, 376, 378, and 380 may have smaller memory capacities than the global forwarding table 311. The forwarding caches 374, 376, 378, and 380 may further be updated with address data learned from data frames that flow through the bridge elements 326, 328, 330, and 332.

The address data may additionally be updated with address data received from the global forwarding table 311. Invalid or changed address data that is updated within one or more of the forwarding caches 374, 376, 378, and 380 of the bridge elements 326, 328, 330, and 332 may be communicated to the global forwarding table 311 of the controlling bridge 348. For example, the bridge element 326 may learn a new MAC address of a newly added device that is configured to receive from or send data to the distributed virtual bridge 308.

The bridge element 326 may verify that a source MAC address included within a received data frame is allowed at a port by checking a list stored within a memory. The bridge element 326 may send a registration message to the controlling bridge 348 to update the global forwarding table 311 with the verified MAC address. The bridge element 326 may further store the MAC address within the forwarding cache 374. In another example, the bridge element 326 may identify a MAC address that is infrequently used. This infrequently used MAC address may be removed from the forwarding cache 374 to make storage room available for other MAC addresses. The bridge element 326 may send an update message to the controlling bridge 348 to have the MAC address removed from the global forwarding table 311.

Address data stored within the global forwarding table 311 may be communicated to one or more forwarding caches 374, 376, 378, and 380 of the distributed virtual bridge 308. For example, the bridge element 326 may receive a data frame that includes a destination MAC address that is not stored within the forwarding cache 374. To obtain information for forwarding the data frame, the bridge element 326 may send a query to a bridge element 339 configured to access the controlling bridge 348. The bridge element 339 may search the global forwarding table 311 for address data associated with the destination MAC address. If the address data is found, the bridge element 339 may forward the MAC address through the distributed virtual bridge 308 to the querying bridge element 326. The bridge element 326 may store the MAC address as address data within the forwarding cache 374. As with the global forwarding table 311, the address data included within the forwarding caches 374, 376, 378, and 380 of the distributed virtual bridge 308 may include both internal address information, as well as addresses that are external to the system 300.

Each of the bridge elements 326, 328, 330, and 332 may be connected to one or more of the transport layer modules 382, 384, 386, and 388. The transport layer modules 382, 384, 386, and 388 may include buffering used for attachment to the integrated switch router 342. The transport layer modules 382, 384, 386, and 388 may further provide a frame-based, Ethernet-like interface to the integrated switch router 342.

The transport layer modules 382, 384, 386, and 388 may each include a shared buffer used to transmit frames across the integrated switch router 342. Additional buffers of the transport layer modules 382, 384, 386, and 388 may be used to receive data frames from the integrated switch router 342. The buffers may be divided into different virtual lanes. Virtual lanes may include logically separated paths for data frame traffic flowing between a bridge element and a transport layer module. For example, there may be four virtual lanes between the bridge element 326 and the transport layer module 382. The transport layer modules 382, 384, 386, and 388 may include logic to recover from faulty microchips and links between a source and a destination. The transport layer modules 382, 384, 386, and 388 may maintain a strict ordering of packets within a particular virtual lane regardless of each data frame's path through the local rack interconnect network 390 and the computer system 300.

The integrated switch router 342 may communicate with the transport layer modules 382, 384, 386, and 388 and may facilitate routing and packet delivery to and from the local rack interconnect network 390. The local rack interconnect network 390 may include links to the bridge elements 326, 328, 330, and 332 located within the same chassis and rack, as well as links to the bridge elements 334-340 in different chassis and racks. The local rack interconnect network 390 may include point-to-point connections, or pipes, between the bridge elements 326, 328, 330, 332, and 333-340 of the distributed virtual bridge 308 with no frame loss and with in-order frame delivery.

The second server computer 304 may include a server computer similar to the first server computer 302 and may be similar to the server computer 302 of FIG. 3. As such, the second server computer 304 may be located within a different chassis and rack than the first server computer 302. Similar to the first server computer 302, the second server computer 304 may include a processor 399 coupled to a memory 397 and to an operating system 395. The processor 399 may include a controlling bridge (CB) 394, a global forwarding table (GFT) 396, and a Fiber Channel Forwarder (FCF) 398. The second server computer 304 may further include virtual machines 355, 357, 359, 361, 363, and 365.

A hypervisor 367 may be coupled to the virtual machines 357, 359. The hypervisor 367 may include a hypervisor virtual bridge 371 that allows direct communication between the virtual machines 357, 359. A hypervisor virtual bridge 373 of a hypervisor 369 coupled to the virtual machines 361, 363 may facilitate direct communication between the virtual machines 361, 363. For example, the hypervisor virtual bridges 371, 373 may register address data with the controlling bridge 348.

The second server computer 304 may also include one or more adapters 318, 320, 322, and 324, such as converged CEE network adapters. Each adapter 318, 320, 322, and 324 may be coupled to one or more of the virtual machines 355, 357, 359, 361, 363, and 365. The adapters 318, 320, 322, and 324 may each include a converged adapter virtual bridge 375, 377, 379, and 381. The converged adapter virtual bridges 375, 377, 379, and 381 may facilitate sharing of the adapters 318, 320, 322, and 324 by coordinating virtual machine access. The adapters 318, 320, 322, and 324 may each couple to one or more of the bridge elements 334, 336, 338, and 340 of the distributed virtual bridge 308. Each adapter 318, 320, 322, and 324 may include one or more CEE transmit ports that couple to one of the bridge elements 334, 336, 338, or 340.

Each bridge element 334, 336, 338, and 340 may include a forwarding cache 383, 385, 387, and 389 that includes address data used to forward data frames that are received by the bridge elements 334, 336, 338, and 340. The bridge elements 334, 336, 338, and 340 may each be connected to one or more transport layer modules 315, 317, 319, and 321. The transport layer modules 315, 317, 319, and 321 may include buffering used for the attachment to the integrated switch router 346. The transport layer modules 315, 317, 319, and 321 may further provide a frame-based, Ethernet-like interface to the integrated switch router 346 and may maintain packet ordering. A portion of the distributed virtual bridge 308 shown in FIG. 3 as located above the local rack interconnect network 390 and as associated with the server computers 302, 304 may be referred to as a north portion. The bridge elements 326, 328, 330, 332, 334, 336, 338, and 340 may be coupled to the adapters 310, 312, 314, 316, 318, 320, 322, and 324.

The I/O blade device 306 may be the I/O server computer 259 of FIG. 2. As such, the I/O blade device 306 may allow uplink connectivity to an, external Ethernet network 392 via an integrated switch router 301 that is coupled to transport layer modules 323, 325, 327, 329, and 331.

The transport layer modules 323, 325, 327, 329, and 331 may each couple to a bridge element 333, 335, 337, and 339. The bridge elements 333, 335, 337, and 339 may each include a forwarding cache 341, 343, 345, and 347. The I/O blade device 306 may be categorized as being included within a south portion of the distributed virtual bridge 308 because the bridge elements 333, 335, 337, and 339 may be coupled to an uplink to the Ethernet 392.

The I/O blade device 306 may include a memory 309, an operating system 391, and a processor 353 that includes the controlling bridge 348. The bridge element 339 may be coupled to the processor 353 via an Ethernet link connection 351. The transport layer module 331 may be coupled to a PCIe bus 344 that is coupled via a PCIe link connection 349 to the processor 353 and the controlling bridge 348. The PCIe bus 344 may also be coupled to a PCIe slot 393.

The controlling bridge 348 may communicate with the bridge elements 326, 328, 330, and 332-340 and other controlling bridges (not shown) of the computer system 300. The controlling bridge 348 may include firmware executing on the processor 353 that manages the bridge elements 326, 328, 330, and 332-340. For example, the controlling bridge 348 may be configured to divide a workload between the bridge elements 326, 328, 330, and 332-340, as well as perform synchronization procedures and failover operations.

The controlling bridges 348, 394 may be configured to interface with and program the bridge elements 326, 328, 330, 332-340. More particularly, the controlling bridge 320 may be configured to generate and send a data frame to one or more of the bridge elements 326, 328, 330, 332-340. The data frames may include register access requests used by the bridge elements 326, 328, 330, 332-340 to access registers.

The controlling bridge 348 may include the Fiber Channel Forwarder 313. FCoE may offer the capability to transport fiber channel payloads on top of an Ethernet network. The Fiber Channel Forwarder 313 may execute the Fiber Channel Initialization Protocol to discover and initialize FCoE capable entities connected to an Ethernet cloud. The Fiber Channel Forwarder 313 may further include firmware that encapsulates and de-encapsulates Fiber Channel data frames (e.g., FCoE formatted data frames). In at least one embodiment, the Fiber Channel Forwarder 313 may translate between Ethernet and Fiber Channel protocols.

The controlling bridge 348 may additionally include the global forwarding table 311. The global forwarding table 311 may include address data (e.g., MAC addresses) that is registered and maintained through communication and cooperation with the bridge elements 326, 328, 330, and 332-340, and in some cases, the hypervisors 362, 367, and 369.

In one example, the global forwarding table 311 may maintain MAC addresses that have been learned by a bridge element 326. The bridge element 326 may register the address data with the controlling bridge 348. The controlling bridge 348 may update the global forwarding table 311 by adding the address data to the global forwarding table 311. Similarly, the bridge element 326 may cause the controlling bridge 348 to update the global forwarding table 311 by sending an update message to the controlling bridge 348. The update message may cause the controlling bridge 348 to delete a MAC address that has been aged out by the bridge element 326. A MAC address may further be deleted when the bridge element 326 has detected that the address data is no longer valid.

In another example, the hypervisor virtual bridge 364 may register MAC addresses or other address data with the controlling bridge 348. The global forwarding table 311 may include address data associated with addresses that are included within the system 300, as well as addresses that are external to the system 300.

FIG. 3 thus shows an embodiment of a system 300 that includes a distributed virtual bridge 308 configured for lossless, point-to-point, in-order data frame delivery. The system 300 may support Fiber channel over Ethernet (FCoE) and may be scalable to include hundreds or more server computers. The controlling bridges 348, 394 may be configured to interface with and program registers of the bridge elements 326, 328, 330, 332-340 and the adapters 366, 368, 370, 372, 375, 377, 379, 381 to reduce administrator workloads. The automated register accesses may reduce potential bottlenecks and facilitate efficient processing.

Figure 4:
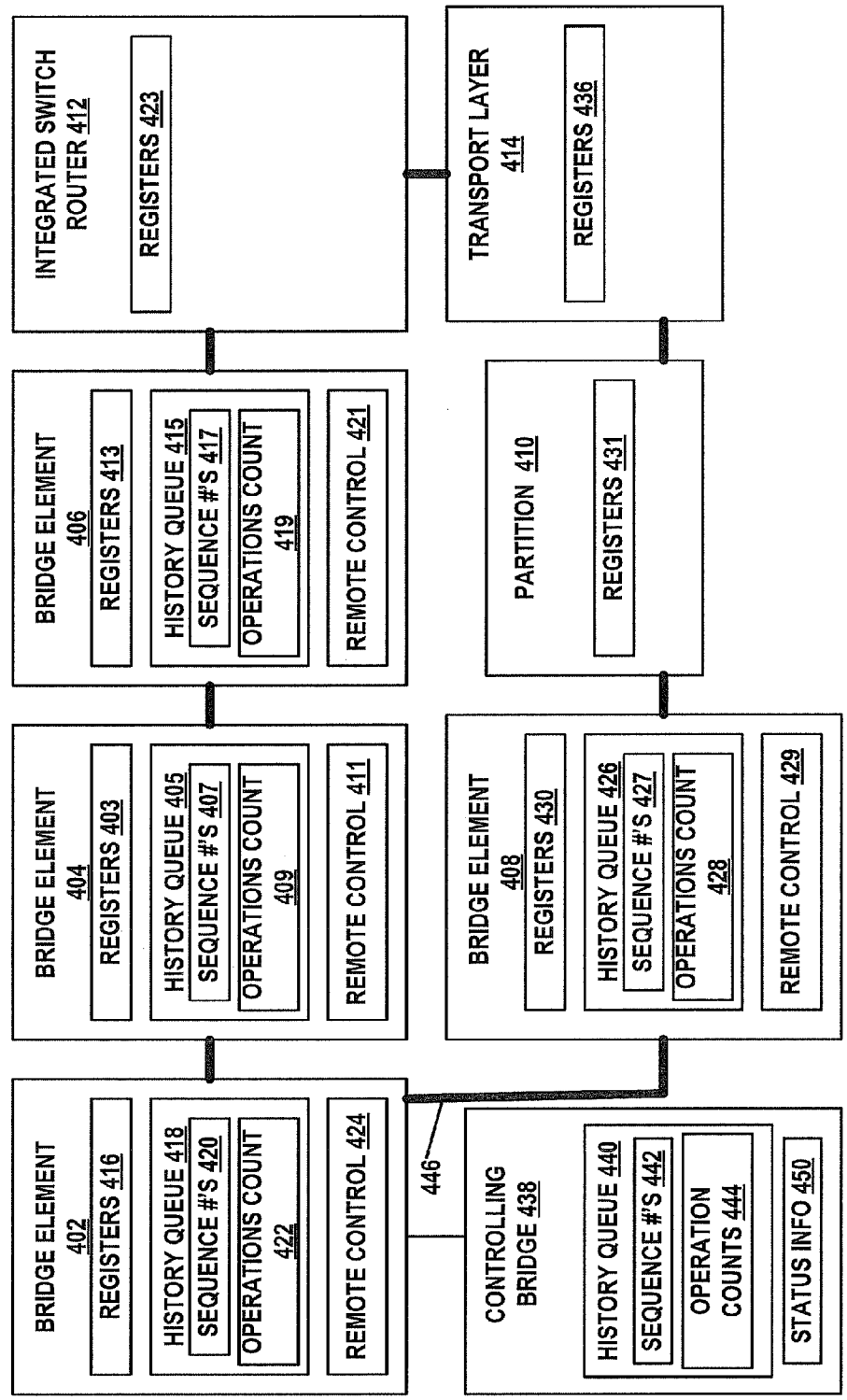
FIG. 4 is a diagram of another particular embodiment of a system configured to conduct register access operations using a plurality of distributed bridge elements and one or more controlling bridges.

FIG. 4 illustrates another particular embodiment of a system 400 configured to conduct register access operations using a plurality of distributed bridge elements 402, 404, 406, 408 and one or more controlling bridges 438. The controlling bridge(s) 438 may be connected by an Ethernet NIC directly or indirectly through a Local Rack Interconnect, such as the Local Rack Interconnect Network 390 of FIG. 3. A main register ring 446 may include a communications path that uses a register ring protocol to connect nodes on a microchip. For example, the main register ring 446 may be coupled to the bridge elements 402, 404, 406, 408, a partition 410, an integrated switch router 412, and a transport layer module 414.

The bridge elements 402, 404, 406, 408 may include low latency, high speed switches that are similar to the bridge elements 326, 328, 330, and 332-340 of FIG. 3. The partition 410 may include a defined storage area that includes registers 431. The integrated switch router 412 may include registers 423 and may be similar to the integrated switch routers 342, 346 of FIG. 3. The transport layer module 414 may include registers 436 and may be similar to the transport layer modules 315, 317, 319, 321, 323, 325, 327, 329, 331, 382, 384, 386, 388 of FIG. 3.

On the main register ring 446, some of the nodes may be both initiators and targets with regard to register access requests. For example, the bridge elements 402, 404, 406, 408 may be configured to both initiate and receive a register access request. Other nodes, such as the partition 410, the integrated switch router 412, and the transport layer module 414, may only receive register access requests.

When making a register access request to another bridge element 402, 406, 408, the bridge element 404 may wait for a token on the main register ring 446. Once the token is received, the bridge element 404 may place the register access request on the main register ring 446. The receiving, or target, bridge element 406 to which the register access request is addressed may execute the register access request and communicate a response to the bridge element 404. The bridge element 404 may then return the token to the main register ring 446. To prevent conflicting register access operations from multiple controlling bridges, the controlling bridge 438 may select a bridge element 406 to be a bridge element control port. The bridge element control port may be used when accessing the registers 423, 431, 436 other than bridge element registers 403, 413, 416, 430.

Each bridge element 402, 404, 406, 408 may directly access its own local registers 403, 413, 416, 430 to facilitate parallel access by the controlling bridge 438. The access may occur without a token received from the main register ring 446. A bridge element 404 may delay operations from the main register ring 446 until the register access requests have been completed.

The bridge element 402 may comprise a local bridge element coupled to the controlling bridge 438. The bridge element 402 may be similar to the bridge element 339 of FIG. 3. The bridge element 402 may include the registers 416, a history queue 418, and a remote control module 424. The history queue 418 may include FIFO entries that include sequence numbers 420. The sequence numbers 420 may correspond to data frames having register access requests. An operations count 422 may correspond to a number of successfully completed register access requests associated with a data frame. While only one history queue 418 is shown as being included in the bridge element 402, an embodiment of another bridge element may include multiple history queues (e.g., a history queue for each controlling bridge that may control the bridge element). The remote control module 424 may be configured to execute the register access requests, as well as to update the sequence numbers 420 and the operations count 422. The remote control module 424 may be configured to update operand fields of the data frame with request status information and to route data frames throughout the system 400.

The controlling bridge 438 may be directly coupled to the bridge element 402 via an Ethernet NIC or may be remotely coupled via a Local Rack Interconnect to communicate with the bridge elements 402, 404, 406, 408 using data frames that include register access requests. The controlling bridge 438 may use a semaphore mechanism to prevent other controlling bridges (not shown) from accessing a register 403, 413, 416, 423, 430, 431, 436 at the same time. The controlling bridge 438 may include a FIFO history queue 440 comprising sequence numbers 442 and operation counts 444. The sequence numbers 442 may be associated with respective data frames and their associated register access requests. The sequence numbers 442 may be unique. The operation counts 444 may be compared to operation counts 409, 419, 422, 428 stored in the bridge elements 402, 404, 406, 408 to determine a status of a register access request.

The controlling bridge 438 may additionally include status information 450 that is associated with register access requests. For example, the controlling bridge 438 may access the status information 450 to set an entry associated with a first register access request to "pending." The status information 450 may be set prior to sending a data frame along with the register access request. When an error is detected, the status information 450 may be updated to reflect details of the detected error. Entries associated with other register access request may be pending until the first register access request has been successfully completed. Illustrative status information may include: pending, completed, not completed with lock conflict, and error (e.g., access timeout, frame too short, and frame too long).

The controlling bridge 438 may insert a four byte sequence number within a field of a data frame. The sequence number field may be unchanged by a receiving bridge element 404 that uses the sequence number field to update the sequence numbers 407. The bridge element 404 may return the data frame and associated sequence number to the controlling bridge 438. The controlling bridge 438 may check the sequence number of the returned data frame against the stored sequence numbers 442 to confirm delivery or to detect a loss of a data frame.

The controlling bridge 438 may access the history queue 415 when a data frame having an expected sequence number is not received at the controlling bridge 438 from the bridge element 406. The controlling bridge 438 may determine by reading the history queue 415 if the data frame having the sequence number was received by the bridge element 406. If the data frame was never received, the controlling bridge 438 may resend the data frame to the bridge element 406. If an entry in the history queue 415 indicates that the data frame was received at the bridge element 406, then the controlling bridge 438 may read the operations count 419 or the number of successfully completed operations. The operations count 419 may be used to determine whether an error was encountered while processing a register access request of the data frame at the bridge element 406.

A successfully completed operation may include a completed semaphore access. Each register access (i.e., a load or a store operation) of a set of sequential register accesses may be counted as a successfully completed operation. A register access that completes in error may not be counted as a successfully completed operation. A register access that includes a read on the main register ring 446 followed by a write to the main register ring 446 may be counted as a single successfully completed operation.

To prevent conflicting register access operations from multiple controlling bridges, the controlling bridge 438 may select a bridge element of the bridge elements 402, 404, 406, 408 to be a bridge element control port. The designated bridge element control port may be used when accessing registers other than bridge element registers. For instance, when a data frame is addressed to a non-bridge element (e.g., the partition 410, the integrated switch router 412, or the transport layer module 414), a bridge element 408 designated by the controlling bridge 438 as the bridge element control port may receive and route the data frame to the non-bridge element target node. The controlling bridge 448 may send data frames directly to the bridge elements 402, 404, 406, 408 (i.e., without use of a designated bridge element control port). For example, when the bridge element 406 is the target of the data frame (and included register access request), the remote control module 421 of the bridge element 406 may receive the data frame.

The bridge elements 404, 406, 408 may comprise north bridge elements, such as the north bridge element 326 of FIG. 3. The bridge element 404 may include registers 403, a history queue 405, and a remote control module 411. The history queue 405 may include FIFO entries that include sequence numbers 407. The sequence numbers 407 may correspond to data frames having register access requests. An operations count 409 may correspond to a number of successfully completed register access requests associated with a data frame. The remote control module 411 may be configured to execute the register access requests, as well as to update the sequence numbers 407, the operations count 409, and the operand fields of the data frame.

The bridge element 406 may include the registers 413, the history queue 415, and a remote control module 421. The history queue 415 may include FIFO entries that include sequence numbers 417. The sequence numbers 417 may correspond to data frames having register access requests. An operations count 419 may correspond to a number of successfully completed register access requests associated with a data frame. The remote control module 421 may be configured to execute the register access requests, as well as to update the sequence numbers 417, the operations count 419, and the operand fields of the data frame.

The bridge element 408 may include the registers 430, a history queue 426, and a remote control module 429. The history queue 426 may include FIFO entries that include sequence numbers 427. The sequence numbers 427 may correspond to data frames having register access requests. An operations count 428 may correspond to a number of successfully completed register access requests associated with a data frame. The remote control module 429 may be configured to execute the register access requests, as well as to update the sequence numbers 427, the operations count 428, and the operand fields of the data frame.

FIG. 4 thus shows an embodiment of a system 400 configured to enable a controlling bridge 438 to initiate register access requests using distributed bridge elements 402, 404, 406, and 408. The controlling bridge 438 may provide trusted (e.g., known and secure) firmware used to control access considerations, such as security, routing, and availability. The controlling bridge 438 may be configured to access registers of local and remote bridge elements 402, 404, 406, 408, as well as other hardware nodes 410, 412, 414. The automated register accesses may reduce potential bottlenecks and facilitate efficient processing.

Figure 5:
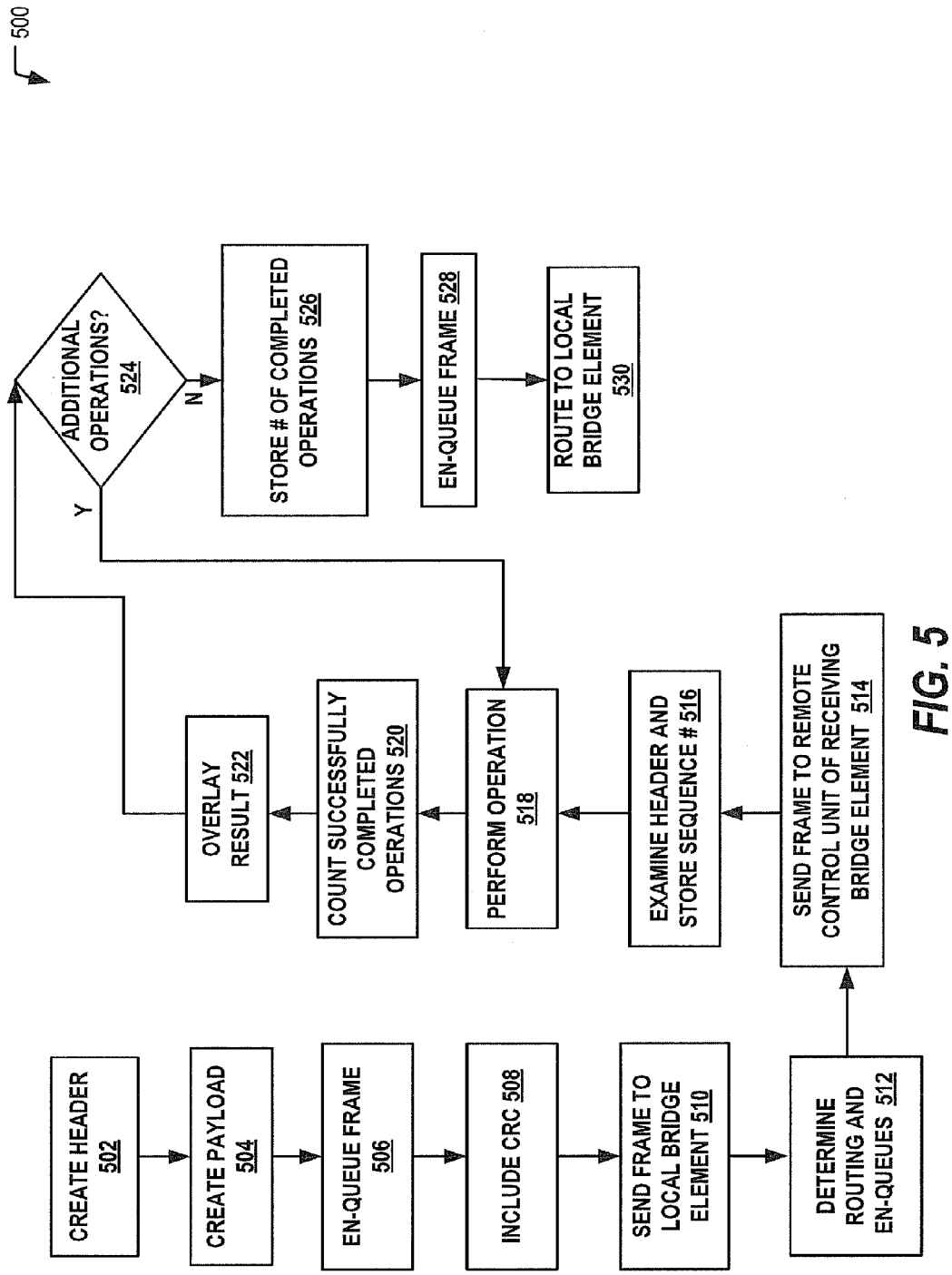
FIG. 5 is a flow diagram of a particular embodiment of a method of using a controlling bridge to program registers of distributed bridge elements and other target nodes.

FIG. 5 is a flow diagram of an embodiment of a method 500 of using a controlling bridge to program registers of distributed bridge elements and other target nodes. In a particular embodiment, the method 500 may be performed by a controlling bridge and bridge elements, such as the controlling bridge 438 and bridge elements 402, 404, 406, 408 of FIG. 4. At 502, a header of a data frame may be created. For example, the controlling bridge 438 of FIG. 4 may create a header that includes a destination address of a target bridge element 406 or other node. The header may also include a source address, such as a MAC address of the controlling bridge 438 or of a network interface card (NIC) coupled to the controlling bridge 438. The header may further include a VLAN tag and an Ethertype.

A payload of the data frame may be created, at 504. For instance, the controlling bridge 438 of FIG. 4 may generate a payload that includes a register access request(s), a sequence number, and a load/store protocol. At 506, the data frame may be en-queued. For example, the controlling bridge 438 of FIG. 4 may prepare the data frame for transmission at the NIC coupled to the controlling bridge 438. A cyclic redundancy check (CRC) or other checksum may be included within the data frame, at 508. For example, the NIC of the controlling bridge 438 of FIG. 4 may append a CRC to the data frame.

At 510, the data frame may be sent to a local bridge element. For instance, the controlling bridge 438 of FIG. 4 may send the data frame to the bridge element 402. The data frame routing information may be determined, at 512. For example, the bridge element 402 of FIG. 4 may determine a routing path of the data frame based upon the header. The bridge element 402 may further en-queue the data frame for delivery to a receiving bridge element 406 via the integrated switch router 412 and the transport layer module 414. The data frame may be sent to a remote control module of the receiving bridge element, at 514. For instance, when the bridge element 406 is the target of the data frame, the remote control module 421 of the bridge element 406 of FIG. 4 may receive the data frame. When the data frame is alternatively addressed to a non-bridge element (e.g., the partition 410 of FIG. 4), a bridge element 408 designated by the controlling bridge 438 to route data frames to non-bridge elements may receive the data frame.

At 516, the header may be examined, and the sequence number associated with the data frame may be stored. For instance, the remote control module 421 of FIG. 4 may evaluate the header of the received data frame. The remote control module 421 may further store the sequence number 417 associated with the data frame in the history queue 415. The register access request, or operation, may be performed, at 518. For instance, the bridge element 406 of FIG. 4 may perform a register access request on the registers 413. When the bridge element 408 has been designated as a bridge element control port and the partition 410 is a target node, the bridge element 408 may wait for a token to be available from the main register ring 446. The token may be used so that only the one bridge element having control of the token may access the target node at a time. When a token becomes available, the register access request may be placed on the main register ring 446 for delivery to the partition 410.

A count of successfully completed operations may be performed, at 520. For example, the bridge element 406 may determine a number of successfully completed register access requests to be stored as the operations count 419. A result of one or more of the operations may be overlain in the data frame, at 522. For instance, the remote control module 421 may evaluate the outcome of each register access request, or operation. When an error is detected for a register access request, the remote control module 421 may insert an error status update into an operand field of the data frame associated with the register access request. The error status update may notify the controlling bridge 438 of the erroneous attempt so that a corrective action may be initiated.

Operations may continue to be performed until no more operations associated with the frame are detected, at 524. In a particular embodiment, the remote control module 421 of FIG. 4 may detect a consecutive string of four zeros to programmatically signal an end of the register access requests of a data frame.

The number of the successfully completed operations may be stored, at 526. For example, the remote control module 421 of FIG. 4 may store the number of successfully completed operations (e.g., load and store operations) associated with a given data frame in the operations count 419. The number of successfully completed operations may be used to determine whether an error was encountered while processing a register access request.

The data frame may be en-queued, at 528. For instance, the remote control module 421 of FIG. 4 may prepare the data frame for return to the controlling bridge 438 via the transport layer module 414. The remote control module 421 may additionally append an updated CRC. Accordingly, the data frame may be routed to the local bridge element, at 530. For instance, the transport layer module 414 may route the data frame via the integrated switch router 412 to the bridge element 402, and ultimately, to the controlling bridge 438. The controlling bridge 438 may receive and store the returned data frame.

FIG. 5 thus shows a method 500 of routing a data frame having a register access request through a network of distributed bridge elements. The controlling bridge 438 may initiate register access requests to facilitate greater accuracy and scalability. The main register ring 446 may be used, along with tokens and semaphores, to streamline remote and local register accesses.

Figure 6:
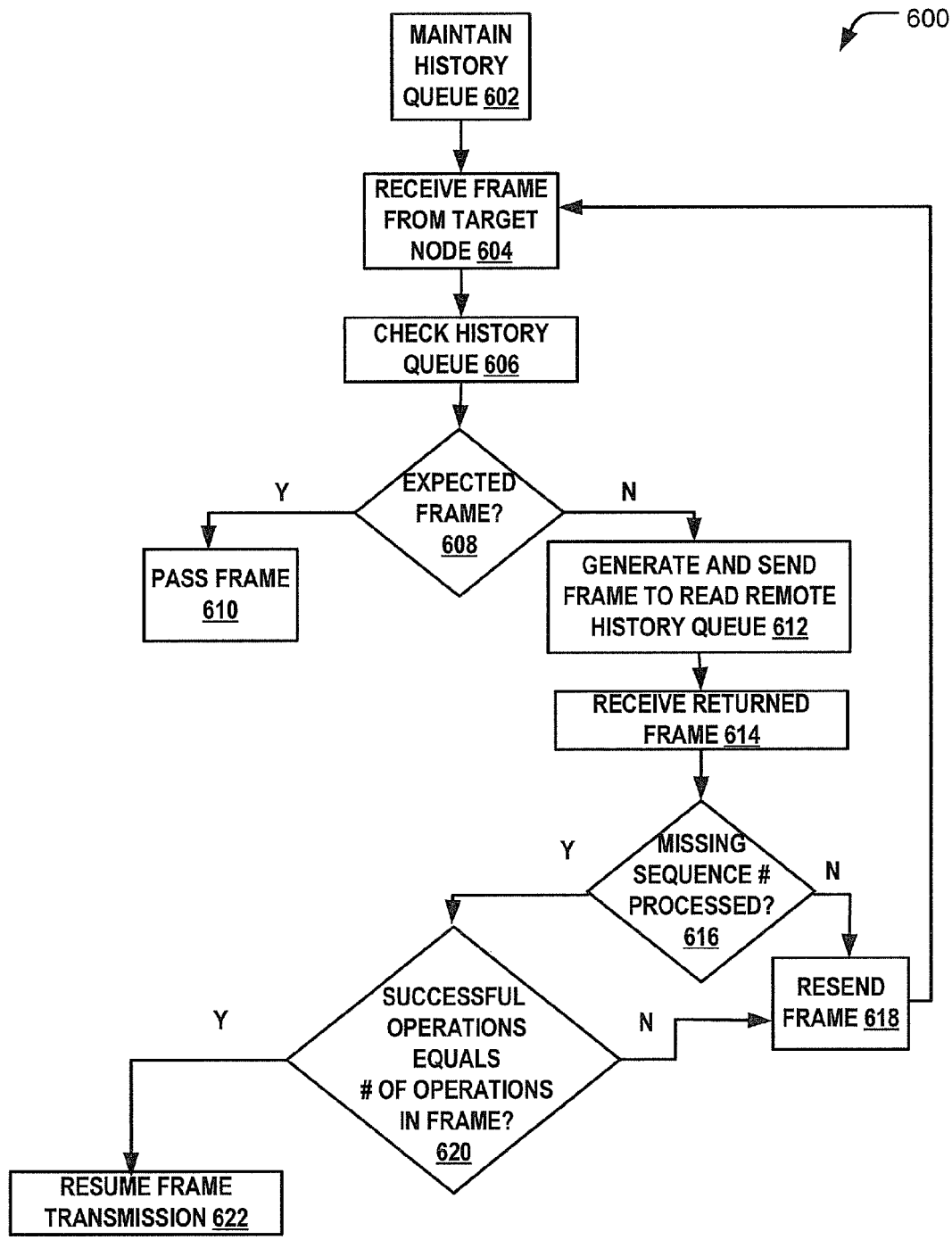
FIG. 6 is a flow diagram of a particular embodiment of a method to detect and respond to register access errors.

FIG. 6 is a flowchart of a particular method 600 of detecting and responding to register access errors. The method 600 may be performed by a controlling bridge in communication with a plurality of bridge elements, such as the controlling bridge 438 and bridge elements 402, 404, 406, 408 of FIG. 4. Turning particularly to the flowchart, a history queue may be maintained, at 602. For example, the controlling bridge 438 of FIG. 4 may continuously update the history queue 440. The history queue 440 may include the sequence numbers 442 and the operation counts 444. As described herein, the sequence numbers 442 may be non-identical and otherwise uniquely associated with respective data frames and their associated register access requests. The operation counts 444 may include a number of successfully completed register access requests. The operation counts may be compared to operation counts 409, 419, 422, 428 stored in the bridge elements 402, 404, 406, 408 to determine a status of a register access request.

At 604, a data frame may be received from a target node at the controlling bridge. For instance, the controlling bridge 438 of FIG. 4 may receive a data frame returned from the bridge element 406. The data frame may have been previously sent to the bridge element 406 to perform one or more register accesses on the registers 413.

The controlling bridge may check the history queue, at 606. For example, the controlling bridge 438 of FIG. 4 may evaluate the sequence numbers 417 of the history queue 415 to compare to a sequence number of the received frame.

At 608, the controlling bridge may determine if the received data frame is the expected frame. For instance, the controlling bridge 438 of FIG. 4 may compare the sequence numbers 442 of the history queue 440 to the sequence number of the received frame. An expected sequence number of the data frame may be a next sequentially numbered (e.g., in-order) sequence number. The sequence numbers 442 may be used to determine the sequence number that should be received with a returned data frame.

The controlling bridge may pass, or approve, the data frame when the received data frame is determined to be the expected data frame, at 610. When the returned data frame is alternatively not the expected data frame, a data frame may have been lost during transmission. The controlling bridge may generate and send a data frame to the history queue of the bridge element from which the returned data frame was sent, at 612. For example, the controlling bridge 438 of FIG. 4 may determine that the returned data frame has a sequence number that does not match the expected, in-order sequence number indicated by the history queue 440. In response, the controlling bridge 438 may generate a data frame to be sent to the bridge element 406. The data frame may be used to read the history queue 415 of the bridge element 406. More particularly, data frame may be processed by the bridge element 406 to include the sequence numbers 417 and the operations count 419 associated with the originally transmitted data frame. The transmission to the target node of data frames having new register access requests may be suspended.

At 614, the returned data frame may be received. For instance, the controlling bridge 438 of FIG. 4 may receive the data frame from the bridge element 406. The returned data frame may include information copied from the history queue 415.

The controlling bridge may determine if the missing sequence number was processed at the target node, at 616. For example, the controlling bridge 438 of FIG. 4 may read the returned data frame to determine if the missing sequence number was processed and recorded at the bridge element 406. If the missing sequence number was not processed, then the original data frame having the register access request may be resent, at 618. The controlling bridge may then await confirmation of the delivery of the data frame, at 604.

When the controlling bridge alternatively determines that the missing sequence number was processed at the target node, then the controlling bridge may determine if the number of successful operations recorded in the returned data frame equals the number of operations in the original data frame, at 620. For instance, the controlling bridge 438 of FIG. 4 may read the data copied from the operations count 419 into the returned data frame. The controlling bridge 438 may compare the copied data to the number of register access requests included in the original data frame and stored in the operation counts 444.

When the number of successful operations recorded in the returned data frame does not equal the number of operations in the original data frame, all or a portion of the original data frame may be resent, at 618. The controlling bridge may then wait for confirmation of the delivery of the data frame, at 604. When the number of successful operations recorded in the returned data frame alternatively equals the number of operations in the original data frame, data frame transmission to the target node may resume, at 622.

FIG. 6 thus shows a method 600 of detecting and recovering from an unsuccessful register access request. The method 600 may detect whether a data frame was lost or a register access request was otherwise unsuccessfully completed. Corrective action may be automatically initiated in response to a detected error. For example, the data frame having the register access request may be resent. Aspects of the method 600 may thus facilitate efficient and accurate register accesses.

Particular embodiments described herein may take the form of an entirely hardware embodiment, an entirely software embodiment or an embodiment containing both hardware and software elements. In a particular embodiment, the disclosed methods are implemented in software that is embedded in processor readable medium and executed by a processor, which includes but is not limited to firmware, resident software, microcode, etc.

Further, embodiments of the present disclosure, such as the one or more embodiments may take the form of a computer program product accessible from a computer-usable or computer-readable medium providing program code for use by or in connection with a computer or any instruction execution system. For the purposes of this description, a computer-usable or computer-readable medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. An apparatus comprising:
 a plurality of server computers;
 a plurality of distributed bridge elements in communication with the plurality of server computers, wherein each distributed bridge element is configured to access a register in response to receiving a data frame that includes a register access request; and
 a controlling bridge configured to control the plurality of distributed bridge elements and to generate and communicate the data frame to at least one of the plurality of distributed bridge elements, wherein the controlling bridge is configured to select a first bridge element of the plurality of distributed bridge elements to communicate the register access request to a non-bridge element node that includes the register.

2. The apparatus of claim 1, wherein the non-bridge element node is an integrated switch router .

3. The apparatus of claim 1, further comprising the non-bridge element node.

4. The apparatus of claim 1, further comprising a main register ring coupled to the plurality of distributed bridge elements, wherein the main register ring includes a token protocol.

5. The apparatus of claim 1, wherein the data frame includes a sequence number associated with the register access request.

6. The apparatus of claim 5, wherein a second bridge element of the plurality of distributed bridge elements is configured to store the sequence number in a memory.

7. The apparatus of claim 5, wherein the controlling bridge is configured to use the sequence number to confirm that the data frame was delivered to the bridge element.

8. The apparatus of claim 7, wherein the controlling bridge is configured to store the sequence number in a memory.

9. The apparatus of claim 1, wherein the data frame is addressed to the non-bridge element node.

10. The apparatus of claim 1, wherein at least one of a second bridge element of the plurality of distributed bridge elements and the controlling bridge stores a count of successfully completed register access requests.

11. The apparatus of claim 1, wherein a second bridge element of the plurality of distributed bridge elements is configured to communicate status information associated with the register access request to the controlling bridge.

12. The apparatus of claim 1, wherein the controlling bridge is configured to resend the data frame in response to determining that an error occurred with respect to at least one of the communication of the data frame and an execution of the register access request.

13. The apparatus of claim 1, wherein at least one of the controlling bridge and a second bridge element of the plurality of distributed bridge elements is configured to initiate a semaphore operation prior to execution of the register access request.

14. A method of performing a register access, the method comprising:
  receiving a data frame at a bridge element of a plurality of bridge elements in communication with a plurality of server computers, wherein the data frame includes a register access request and is forwarded from a controlling bridge in communication with the plurality of bridge elements; and
  accessing a register and initiating execution of the register access request in response to receiving the data frame, wherein the data frame includes a sequence number associated with the register access request, wherein the controlling bridge is configured to use the sequence number to confirm that the data frame was delivered to the bridge element, and wherein the controlling bridge is configured to store the sequence number in a memory.

15. The method of claim 14, further comprising accessing the register using a token.

16. The method of claim 14, further comprising accessing the register without using a token, wherein the register is included within the bridge element.

17. The method of claim 14, further comprising storing within the memory a count of successfully completed register access requests.

18. The method of claim 14, further comprising selecting the bridge element from among the plurality of bridge elements to communicate the register access request to a non-bridge element node that includes the register.

19. The method of claim 14, further comprising communicating status information associated with the register access request to the controlling bridge.

20. A program product for accessing a register, the program product comprising:
  a computer readable storage medium having computer readable program code embodied therewith, the computer readable program code comprising program instructions resident at a bridge element of a plurality of bridge elements in communication with a plurality of server computers, the program instructions configured to receive from a controlling bridge a data frame that includes a register access request, to access the register, and to initiate execution of the register access request in response to receiving the data frame, wherein the bridge element is configured to communicate status information associated with the register access request to the controlling bridge.

* * * * *